United States Patent [19]

Seko et al.

[11] Patent Number: 5,065,382
[45] Date of Patent: Nov. 12, 1991

[54] DISC MEMORY APPARATUS

[75] Inventors: Satoru Seko; Yoshiyuki Kunito, both of Kanagawa, Japan

[73] Assignee: Sony Corporation, Tokyo, Japan

[21] Appl. No.: 588,695

[22] Filed: Sep. 27, 1990

[51] Int. Cl.$^5$ .................... G11B 21/02; G11B 7/095
[52] U.S. Cl. .................... 369/44.26; 360/77.05; 360/77.08; 360/78.11
[58] Field of Search .................... 360/72.01, 77.02, 77.03, 360/77.05, 77.08, 78.04, 78.11, 78.14; 369/32, 48, 58, 44.26

[56] References Cited

U.S. PATENT DOCUMENTS

4,415,939 11/1983 Ballard .................... 360/77.08

Primary Examiner—Roy N. Envall, Jr.
Assistant Examiner—Nabil Hindi
Attorney, Agent, or Firm—Philip M. Shaw, Jr.

[57] ABSTRACT

A disc memory apparatus comprises: transducer means for reading and writing information on a disc; at least one disc medium having a plurality of concentric tracks each of which is divided into plural data sectors and plural servo sectors therebetween, the data signal being recorded and read by the transducer means on and from the data sectors, the servo sectors having first address region for odd one of the concentric tracks and second address region for even one of the concentric tracks, wherein first and second address signals are prerecorded in the first and second address regions respectively, the width of the address regions in a radial direction of the disc medium being substantially larger than track pitch of said concentric tracks, the first and second address regions being located at different positions in a direction perpendicular to the radial direction, and the servo sectors further having first and second marker regions the centers of which are corresponding to the centers of the odd and even one of the concentric tracks respectively, wherein first and second marker signals are prerecorded in the first and second marker regions respectively; positioning means for positioning the transducer means on a selected one of the concentric tracks; servo signal processing means for receiving the address signals and marker signals and for outputting servo control signal; and positioning control means for receiving the servo control signal and for controlling the positioning means so that the transducer means seeks the selected one of the concentric tracks.

7 Claims, 8 Drawing Sheets

(PRIOR ART)

DISC MEMORY APPARATUS

BACKGROUND OF THE INVENTION

1. Field of the Invention

The present invention relates to a disc memory apparatus and, more particularly, to a servo signal recorded in a servo zone which is provided on a magnetic disc to detect a position.

2. Description of the Prior Art

Figure 1:
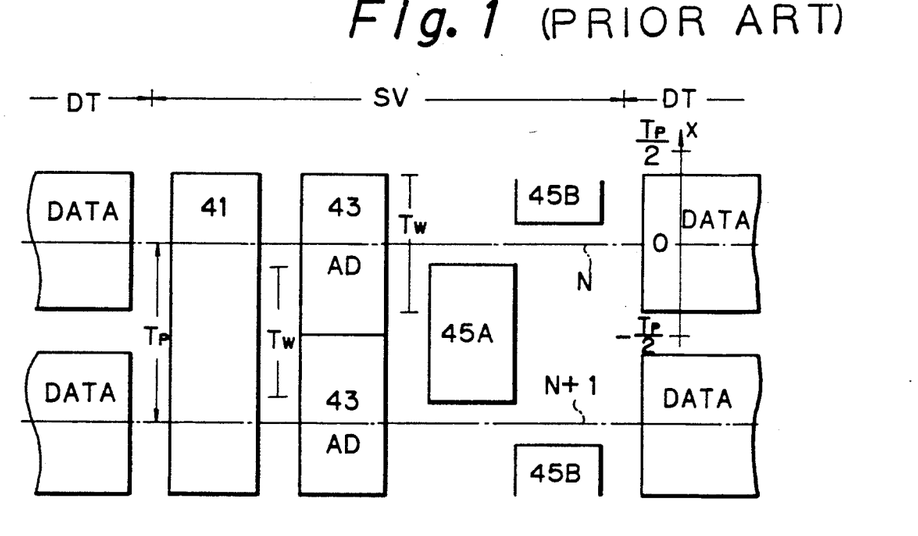
FIGS. 1, 2 and 3A-3C are schematic diagrams which are used to explain the conventional servo zone.

As one of the magnetic discs, there has been known a disc having a servo zone in which information to detect a position has prerecorded on a unit basis of a predetermined length of a track, for instance, on a sector unit basis. FIG. 1 shows an example of a servo zone of a conventional magnetic disc. An alternate long and short dash line indicates a track center of each of the Nth and (N+1)th tracks which are formed at a track pitch Tp. Tw denotes a track width of the magnetic head for recording/reproducing. Since it is impossible to completely eliminate a tracking error, Tp and Tw are set such that (Tp>Tw) and a guard band is provided between adjacent tracks. In general, Tp is selected to about (Tp=⅝ Tw).

A servo header 41 indicative of the start position of the servo zone is recorded at the head of the servo zone Sv. The servo header 41 denotes special data which can be distinguished from the digital data which is recorded/reproduced. An address region 43 in which an address AD of a track unit is recorded is provided after the servo header 41 Detection signals 45A and 45B to detect the positions are provided after the address region 43. The detection signals 45A and 45B are recorded as a diced pattern so as to be located on the inner and outer peripheral sides with respect to each center of tracks, respectively. On the other hand, the detection signals 45A and 45B are recorded at the position which are deviated in the track direction. Therefore, for instance, the levels of the respective reproduction signals can be independently detected at the timings based on the clocks synchronized with the reproduction signal of the servo header 41. The detection signals 45A and 45B are the signals in which pulse signals of a predetermined frequency, what is called, bursts are recorded.

Figure 2:
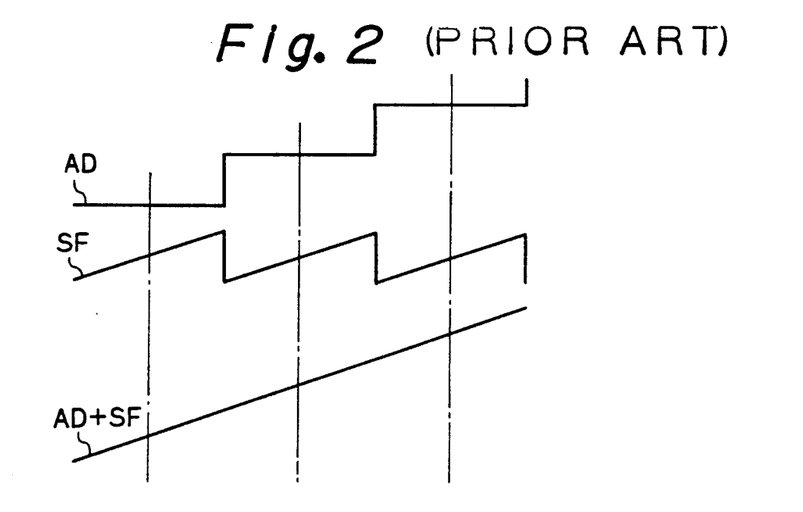

In the above servo zone SV, the address AD regenerated from the address region denotes the coarse servo information (referred to as address information) of the position information. The fine servo information is formed from the reproduction signal of each of the detection signals 45A and 45B. That is, as shown in FIG. 2, the address AD is an integer value which changes step by step every track. The fine servo information SF denotes a value which changes like a sawtooth wave with a width of one track pitch Tp. Therefore, by adding the value of the address AD and the fine servo information SF, the position information (AD+SF) which continuously changes in the radial direction of the disc is formed. The subtraction is executed between the level of the reproduction signal from the detection signal 45A and the level of the reproduction signal from the detection signal 45B and the result of the subtraction is normalized as will be explained hereinlater, so that the fine servo information SF is formed.

The fine servo information SF is used to accurately position the magnetic head onto the track. On the other hand, in the seeking operation to access the target track, the position information (AD SF) is differentiated and the speed of the magnetic head is detected. By using the detected speed, there is executed a control to move the magnetic head in accordance with a desired speed profile.

With respect to the fine servo information SF, the level difference between the reproduction signals of the detection signals 45A and 45B cannot be directly used. This is because the levels of the reproduction signals of the detection signals 45A and 45B fluctuate due to the difference between the recording and reproducing capabilities of the magnetic head and the magnetic disc, the difference of the linear speeds between the inner rim side and the outer rim side, the difference between the flying heights, and the like. Hitherto, to solve such a problem, a sum signal of the reproduction signals of the detection signals 45A and 45B is obtained, thereby executing the normalization to divide the difference signal by the sum signal.

Figure 3A:
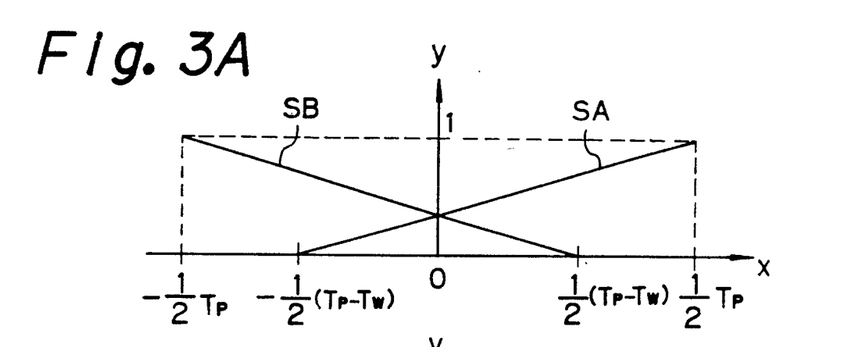

The conventional normalization will be described with reference to FIG. 3. With respect to the radial direction of a certain track, for instance, the Nth track, it is assumed that there is a deviation of x between the center of the magnetic head and the track center (refer to FIG. 1). When x is set to an axis of abscissa and the relative level (the maximum value is set to 1) of the reproduction signals is expressed as y, reproduction outputs SA and SB of the detection signals 45A and 45B change for x as shown in FIG. 3A. When the track center is set to 0, the reproduction output SA is set to 0 in a range from $x=-\frac{1}{2}$ Tp to $x=\frac{1}{2}$ (Tp−Tw) and is set to the maximum value at $x=\frac{1}{2}$ Tp. On the other hand, the reproduction output SB is set to 0 in a range from $x=\frac{1}{4}$ Tp to $x=\frac{1}{4}$ (Tw −Tp) and is set to the maximum value at $x=-\frac{1}{2}$ Tp.

Figure 3B:
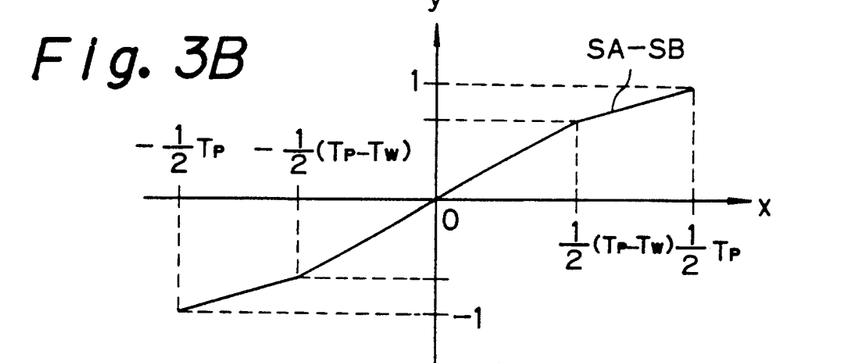
Figure 3C:
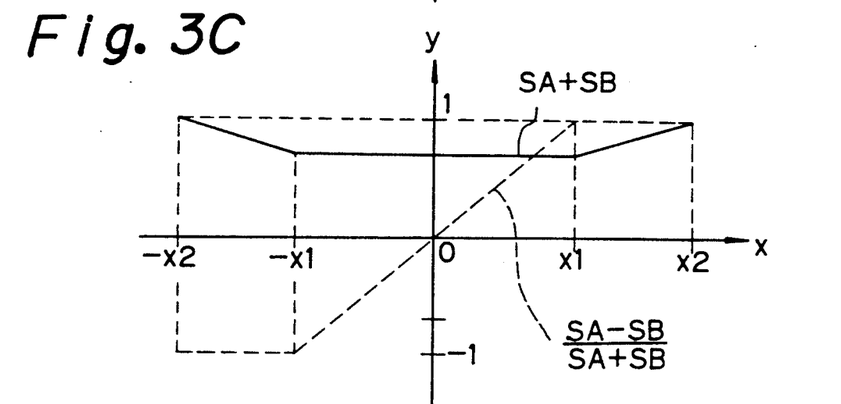

The difference (SA−SB) between the reproduction outputs is as shown in FIG. 3B and is set to 0 at x=0. The sum (SA+SB) of the reproduction outputs is as shown by a solid line in FIG. 3C. Therefore, the normalized fine servo information SF (=(SA−SB)/(SA+SB)) shown by a broken line in FIG. 3C is derived.

The reproduced outputs SA and SB shown in FIG. 3A are set to 0 in a range from $\pm\frac{1}{2}$ (Tp−Tw) to $\pm\frac{1}{4}$ Tp because of the relation of (Tp>Tw), so that the difference output shown in FIG. 3B becomes like an S-shape. Further, the sum signal shown by a solid line in FIG. 3C has a level which changes with x. From the above relation, the fine servo information SF obtained by the normalization is such that the linearity is worse than that of the original difference signal and in a range from $\pm\frac{1}{4}$ (Tp−Tw) to $\pm\frac{1}{4}$ Tp the level is constant with respect to the change of x, that is, the sensitivity is set to zero. Such a fine servo information SF of bad linearity prevents accurate tracking to the target track and causes a problem such that an accurate speed detection cannot be performed from the position information.

On the other hand, in the seeking operation, since the magnetic head moves while obliquely transversing a plurality of tracks, it is necessary to accurately obtain the position information at any position on the disc. When the magnetic head is located between adjacent tracks, the address regions 43 of the respective tracks are simultaneously reproduced, so that there occurs a problem such that the correct address cannot be read. To solve the above problem, as disclosed in U.S. Pat. No. 4,032,984, there has been proposed a method whereby the address AD is set to a code of a gray code and the neighboring property of the gray code is used. However, in the case of the gray code, since it is necessary to preserve the neighboring property, there is a subject such that the digital modulating system which can be used is limited.

OBJECTS AND SUMMARY OF THE INVENTION

It is, therefore, an object of the invention to provide a disc memory apparatus which can obtain a fine servo information of good linearity of the change corresponding to the track deviation.

It is another object of the invention to provide a disc memory apparatus which can accurately detect the address even at any position on a disc.

According to an aspect of the invention, there is provided a disc memory apparatus comprising:

transducer means for reading and writing information on a disc;

at least one disc medium having a plurality of concentric tracks each of which is divided into plural data sectors and plural servo sectors therebetween, the data signal being recorded and read by the transducer means on and from the data sectors, the servo sectors having first address region for odd one of the concentric tracks and second address region for even one of the concentric tracks, wherein first and second address signals are prerecorded in the first and second address regions respectively, the width of the address regions in a radial direction of the disc medium being substantially larger than track pitch of the concentric tracks, the first and second address regions being located at different positions in a direction perpendicular to the radial direction, and the servo sectors further having first and second marker regions the centers of which are corresponding to the centers of the odd and even one of the concentric tracks respectively, wherein first and second marker signals are prerecorded in the first and second marker regions respectively;

positioning means for positioning the transducer means on a selected one of the concentric tracks;

servo signal processing means for receiving the address signals and marker signals and for outputting servo control signal; and positioning control means for receiving the servo control signal and for controlling the positioning means so that the transducer means seeks the selected one of the concentric tracks.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

An embodiment of the present invention will be described hereinbelow with reference to the drawings. The description will be made in accordance with the following order.

a. Disc driving apparatus
b. Construction of servo zone
c. Formation of fine servo information
d. Formation of address information
e. Modification a. Disc driving apparatus

Figure 4:
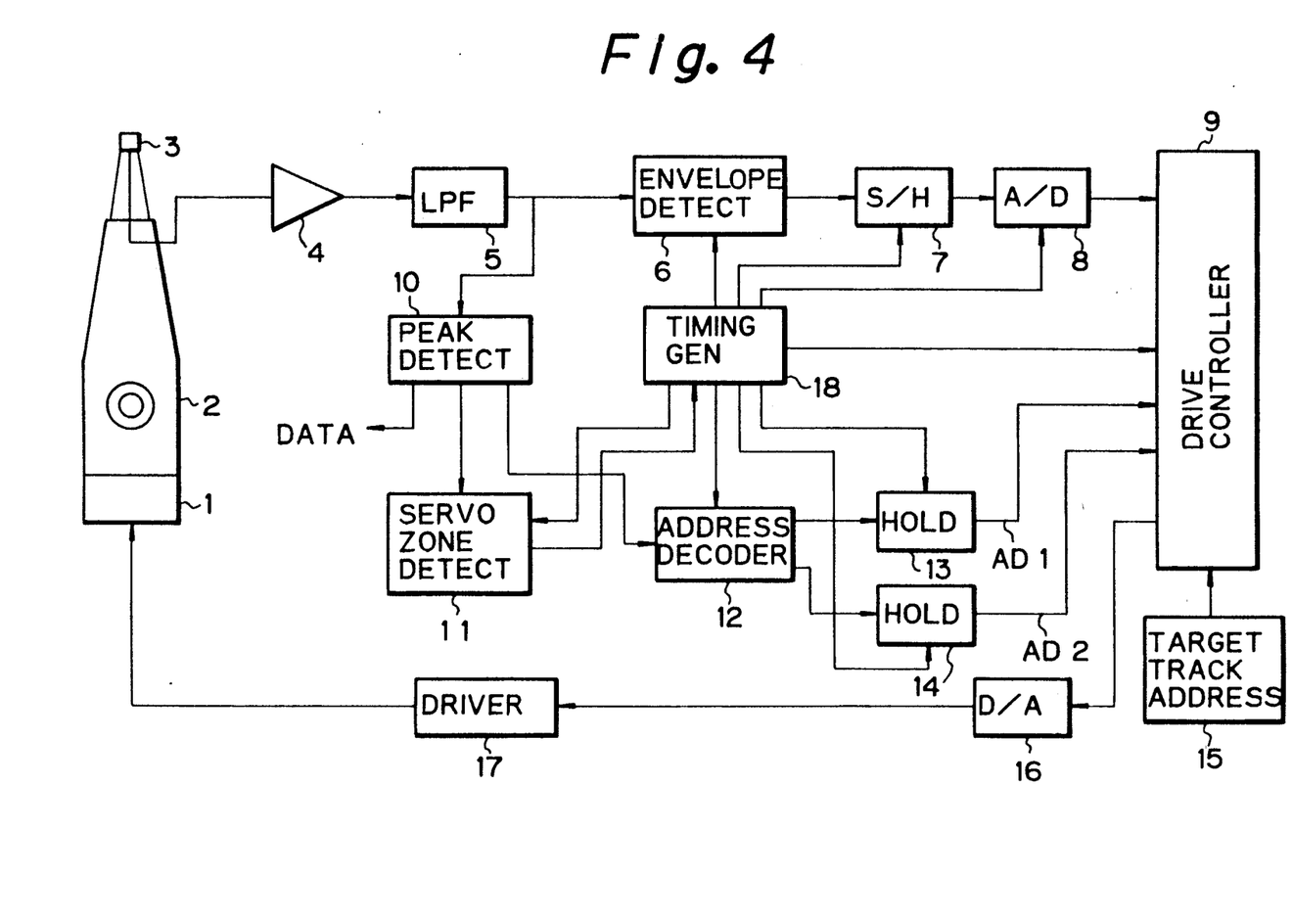
FIG. 4 is a block diagram of a disc driving apparatus for reproducing a magnetic disc to which the invention was applied.

FIG. 4 shows a construction of a disc drive to reproduce a magnetic disc to which the invention was applied. In FIG. 4, reference numeral 1 denotes an actuator, for instance, a voice coil motor. A magnetic head 3 attached to the tip of an arm 2 is moved in the radial direction of the magnetic disc (not shown) by the voice coil motor 1.

A reproduction output of the magnetic head 3 is supplied to a low pass filter 5 through a head amplifier 4. A reproduction signal of a predetermined frequency is separated by the low pass filter 5. The reproduction signal is supplied to an envelope detecting circuit 6. An output signal of the envelope detecting circuit 6 is supplied to a sample and hold circuit 7. Sampling pulses of different phases are supplied from a timing generating circuit 18 to the sample and hold circuit 7. A reproduction output of the position detection signal of the servo zone on the magnetic disc and a reproduction output of the level detection signal are separated and extracted by the sampling pulses: An output signal of the sample and hold circuit 7 is supplied to the A/D converter 8. The digital data corresponding to the level of the reproduction output of each signal is supplied from an A/D converter 8 to a drive controller 9.

The reproduction signal which was extracted through the low pass filter 5 is supplied to a peak detecting circuit 10 and the waveform of the reproduction signal is shaped. The reproduction data which was read out of the data region is obtained from the peak detecting circuit 10. On the other hand, an output signal of the peak detecting circuit 10 is supplied to a servo zone detecting circuit 11. A servo header recorded at the head of the servo zone is detected. A detection signal of the servo header is supplied to the timing generating circuit 18. A timing signal synchronized with the reproduction signal is formed. That is, the timing generating circuit 18 respectively generates a timing signal to the envelope detecting circuit 6, a sampling pulse to the sample and hold circuit 7, a clock to the A/D converter 8, a clock to the drive controller 9, an AGC switching signal to the peak detecting circuit 10, a timing signal to the servo zone detecting circuit 11, and timing signals to a address decoder 12 and holding circuits 13 and 14, which will be explained hereinlater. The AGC circuit provided in the peak detecting circuit 10 is controlled by the AGC switching signal so that the AGC operation is turned off in the servo zone.

An output signal of the peak detecting circuit 10 is supplied to the address decoder 12. The address decoder 12 decodes the address information recorded in the servo zone. As will be explained hereinlater, there are two addresses AD1 and AD2 as the address information. The address AD1 from the address decoder 12 is supplied to the holding circuit 13. The addres AD2 is supplied to the holding circuit 14. The values of the previous addresses are held by the holding circuits 13 and 14 until the values of the addresses then change. The addresses AD1 and AD2 held in the holding circuits 13 and 14 are supplied to the drive controller 9.

The drive controller 9 is constructed by, for instance, a microcomputer. In the seeking operation, a target track address 15 is supplied from a host processor (not shown) to the drive controller 9. A drive signal formed by the drive controller 9 as will be explained hereinlater is supplied to a D/A converter 16. An analog drive signal from the D/A converter 16 is supplied to the voice coil motor 1 through a driver 17.

Figure 5:
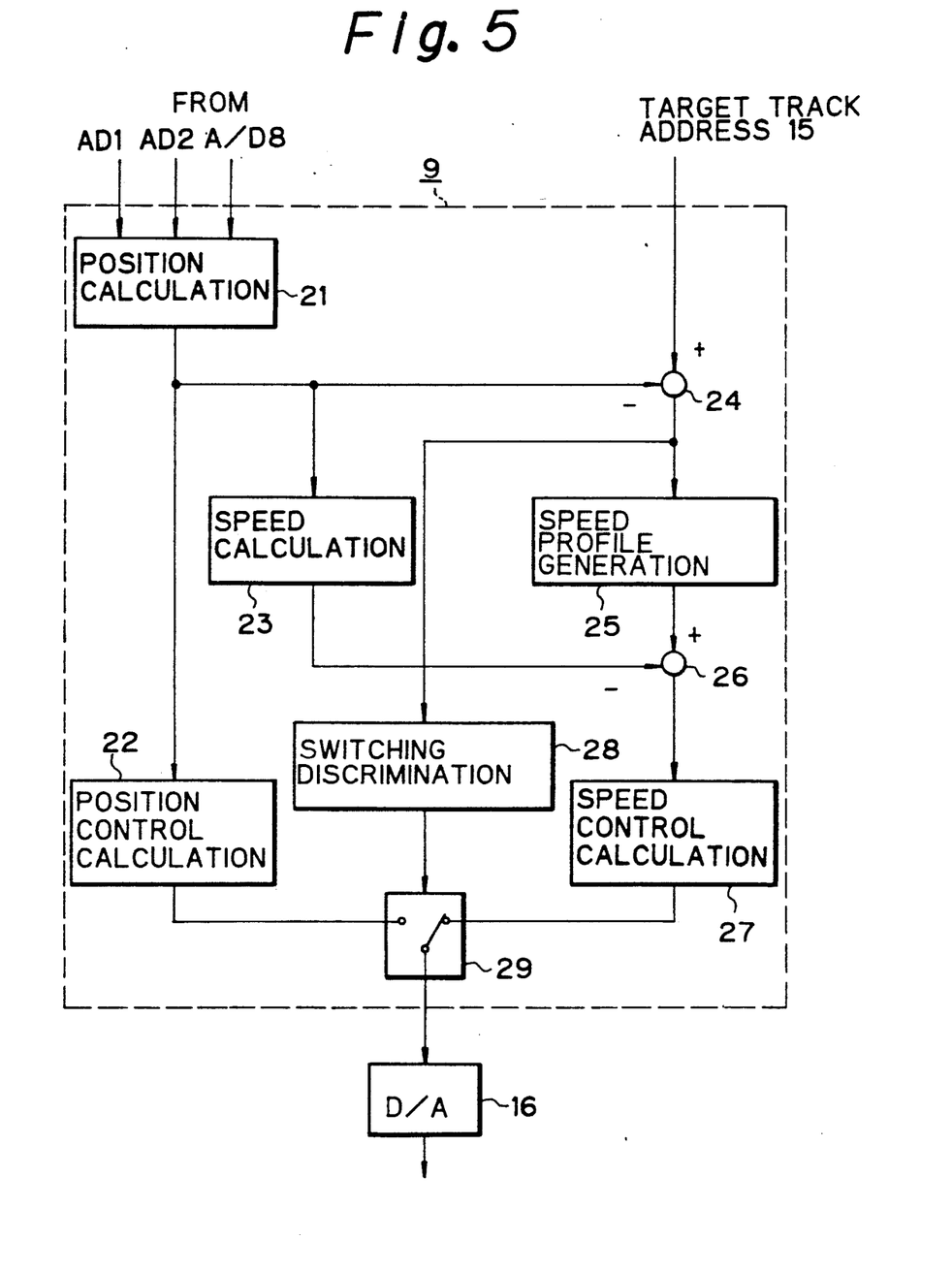
FIG. 5 is a block diagram of a part of the disc driving apparatus.

FIG. 5 is a block diagram showing the drive signal producing operation which is realized by the software process in the drive controller 9. The addresses AD1 and AD2 from the holding circuits 13 and 14 and the output signal of the A/D converter 8 are supplied to a position calculation block 21. In the position calculation block 21, the reproduction signal of the position detection signal is processed and the fine servo information is calculated. On the other hand, the address information is obtained on the basis of the addresses AD1 and AD2 and the reproduction output of the level detection signal. Further, by adding the address information and fine servo information, the position information indicative of the position of the magnetic head 3 is calculated.

The position information from the position calculation block 21 is given to a position control calculation block 22, a speed calculation block 23, and a subtracter 24. The position control calculation block 22 produces a control signal to position the magnetic head 3 over the target track near the target track. The speed calculation block 23 produces a speed signal by differentiating the position information. The subtracter 24 detects the difference between the target track addres 15 and the present position of the magnetic head 3 indicated by the position information. An output of the subtracter 24 is supplied to a speed profile generation block 25 and a switching discrimination block 28.

The speed profile generation block 25 determines the speed of the magnetic head 3 on the basis of the distance between the present position of the magnetic head 3 shown by the output of the subtracter 24 and the target track. The speed profile is set in a manner such that the magnetic head 3 is moved at the maximum speed when the distance is large and that the speed of the magnetic head 3 is decelerated as the distance decreases. The speed determined by the speed profile generation block 25 and the present speed from the speed calculation block 23 are supplied to a subtracter 26. The differential component between them is output from the subtracter 26. The differential component is supplied to a speed control calculation block 27. The speed control calculation block 27 calculates a speed control signal to control so that the speed of the magnetic head 3 coincides with the speed profile.

The speed control signal from the speed control calculation block 27 and the position control signal from the position control calculation block 22 are supplied to a selector 29. The selector 29 is controlled by the switching discrimination block 28. The switching discrimination block 28 generates a control signal for the selector 29 from the output signal of the subtracter 24. That is, when the distance between the magnetic head 3 and the target track is large, the selector 29 selects the speed control signal. The selector 29 selects the position control signal at a position which is fairly close to the target track. The signal selected by the selector 29 is output from the drive controller 9 to the D/A converter 16.

b. Construction of servo zone

A number of tracks are concentrically or spirally formed on the magnetic disc. One track is divided into a predetermined number of sectors. The servo zone to detect the position is prerecorded into each sector. It is not always necessary to provide the servo zone in correspondence to one sector. The servo zone can be provided every plurality of sectors or a plurality of servo zones may be also provided in one sector.

Figure 6:
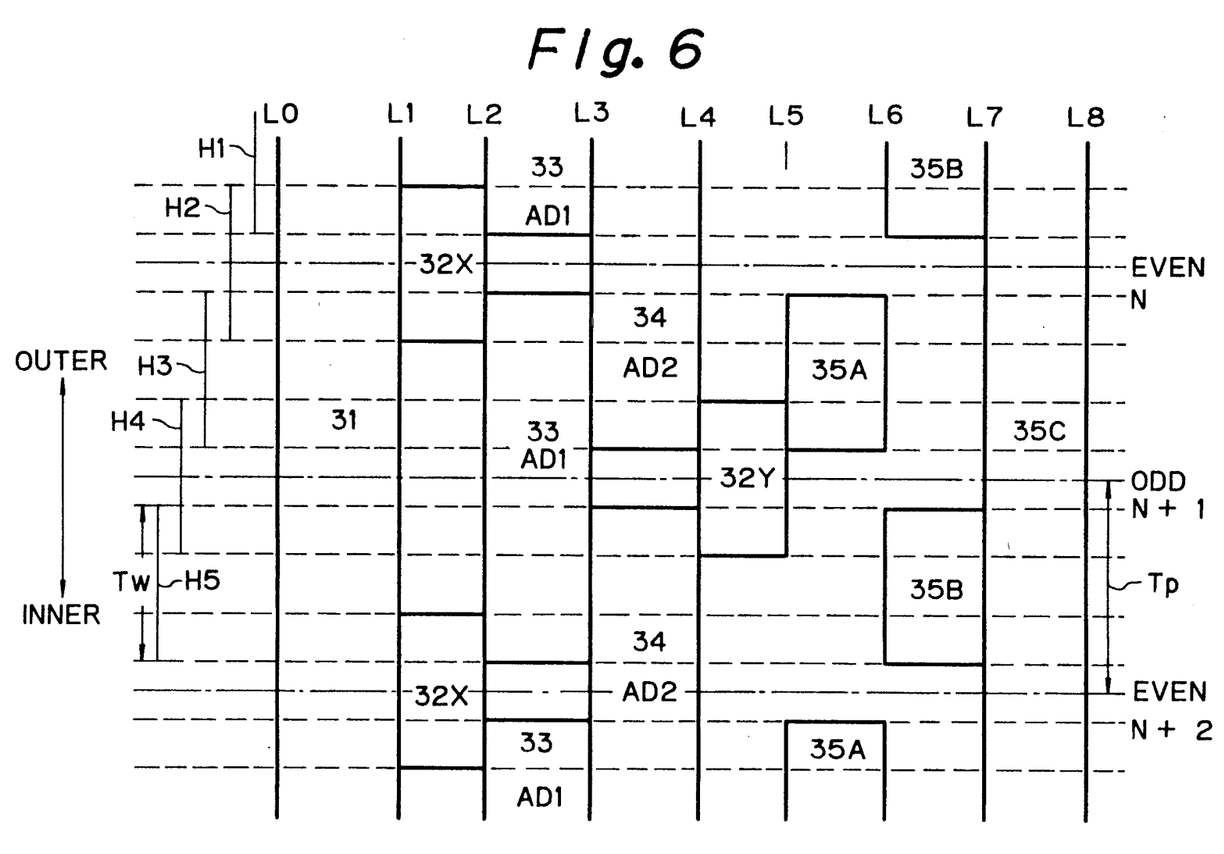
FIG. 6 is a schematic diagram showing a construction of servo zones in an embodiment of the invention.

FIG. 6 shows a construction of the servo zones in the embodiment. The center of the track which is formed every track pitch Tp is shown by an alternate long and short dash line. The addresses of every track are set so as to increase such as N, N+1, N+2, ..., for instance, from the outer rim side to the inner rim side. N, N+2, ... denote the even number designated addresses and N−1, N+1, ... indicate the odd number designated addresses. There is a relation of (Tp>Tw) between the track width Tw of the magnetic head 3 and the track pitch Tp. In the seeking operation, as shown by H1, H2, H3, H4, H5, ... in FIG. 6, the magnetic head 3 scans the disc.

The servo zone starts from a position L0 in the track direction. A servo header 31 is recorded between the positions L0 and L1. A digital signal which is recorded in the servo header 31 is a code signal of a special bit pattern which can be distinguished from the digital data which is recorded in the data region. The servo header 31 is detected by the servo zone detecting circuit 11 and the start of the servo zone is detected.

A first level detection signal 32X whose center coincides with the track center of the even number designated address and whose width is equal to the track width Tw of the magnetic head is recorded between the positions L1 and L2. A first address region 33 in which the first address AD1 was recorded with the width from the track center of the odd number designated address to the position near the track center of the even number designated address is provided between the positions L2 and L3. A second address region 34 in which the second address AD2 was recorded with the width from the track center of the even number designated address to the position near the track center of the odd number designated address is provided between the positions L3 and L4. Therefore, the addresses AD1 and AD2 have a phase difference of one track pitch Tp in the radial direction of the disc. A second level detection signal 32Y whose center coincides with the track center of the odd number designated address and whose width is equal to track width Tw of the magnetic head is recorded between the positions L4 and L5. Pulse signals of a predetermined frequency are recorded in the level detection signals 32X and 32Y.

Envelopes of the reproduction signals of the level detection signals 32X and 32Y are detected by the envelope detecting circuit 6. The envelope is supplied to the sample and hold circuit 7. The values of the envelopes of the reproduction signals of the level detection signals 32X and 32Y are sampled. Sampling outputs are converted into digital data by the A/D converter 8. The addresses AD1 and AD2 are decoded by the address decoder 12. The addresses which are discretely obtained are held in the holding circuits 13 and 14.

A pattern to obtain the fine servo information is recorded between a position L5 and a position L8 of the end portion of the servo zone. First, a first position detection signal 35A is recorded between the positions L5 and L6. The first position detection signal 35A is provided between the inner rim side of the track center of the even number designated address and the outer rim side of the track center of the odd number designated address. A second position detection signal 35B is recorded between the positions L6 and L7 which are different from the first position detection signal 35A in the track direction. The second position detection signal 35B is provided between the inner rim side of the track center of the odd number designated address and the outer rim side of the track center of the odd number designated address.

Further, a band-shaped third position detection signal 35C extending in the radial direction of the disc is provided between the positions L7 and L8 after the position detection signals 35A and 35B. The third position detection signal 35C is continuously formed between adjacent tracks without providing an unrecorded region. Pulse signals of a predetermined frequency are recorded in the position detection signals 35A, 35B, and 35C.

The servo zones shown in FIG. 6 mentioned above are prerecorded to the magnetic disc. As a method of prerecording, it is possible to use a method whereby a track for clocks in which a signal of a predetermined frequency was continuously recorded is formed on the outer most periphery of the disc and the reproduction signal of the track is reproduced by a fixed head and the signal in the servo zone is recorded at a predetermined timing synchronized with the reproduced clock. On the other hand, the level detection signals 32X and 32Y and the position detection signals 35A, 35B and 35C are formed by using the pulse signals which were generated synchronously with the clocks. The third position detection signal 35C is formed by the magnetic head which moves in the radial direction at a distance smaller than the track width. In this case, the phase of the signal which was precedingly recorded and the phase of the signal which is over written are made coincide. Thus, since the phases are deviated, the reduction in level of the reproduction signal of the third position detection signal 35C is prevented.

c. Formation of fine servo information

The reproduced position detection signals 35A, 35B and 35C are converted into the digital values corresponding to their levels by the sample and hold circuit 7 and A/D converter 8. The digital values are supplied to the drive controller 9. In the position calculation block 21 of the drive controller 9, the fine servo information SF is formed from the output of the A/D converter 8.

Figure 7A:
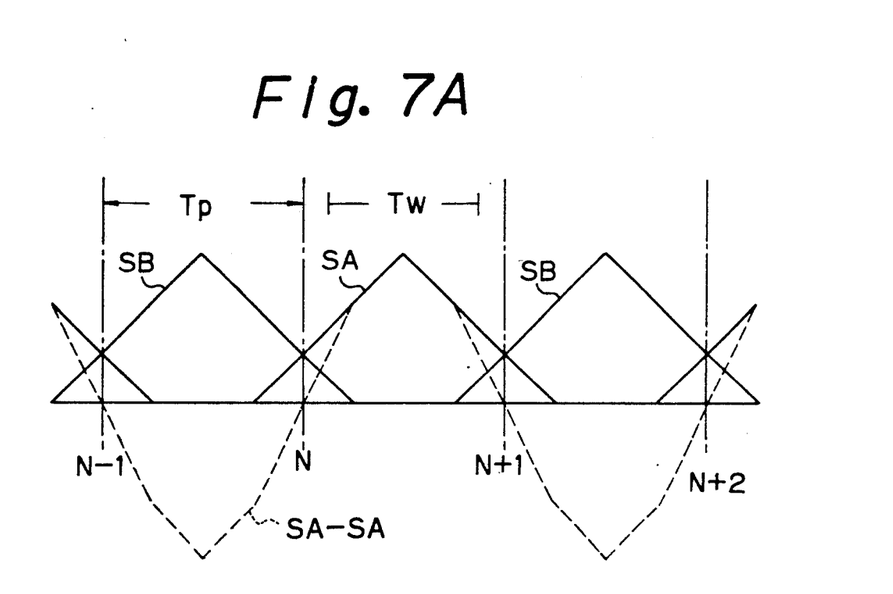
FIGS. 7A-7C are schematic diagrams which is used to explain the formation of fine servo information.
Figure 7B:
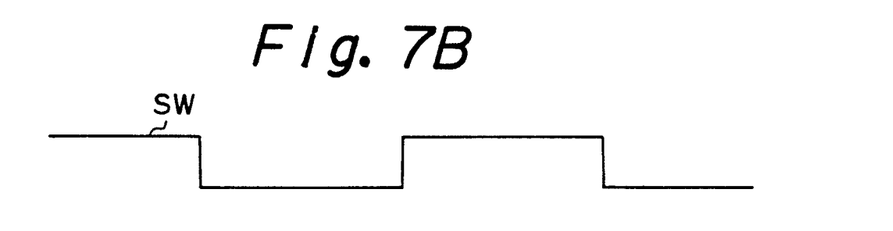
Figure 7C:
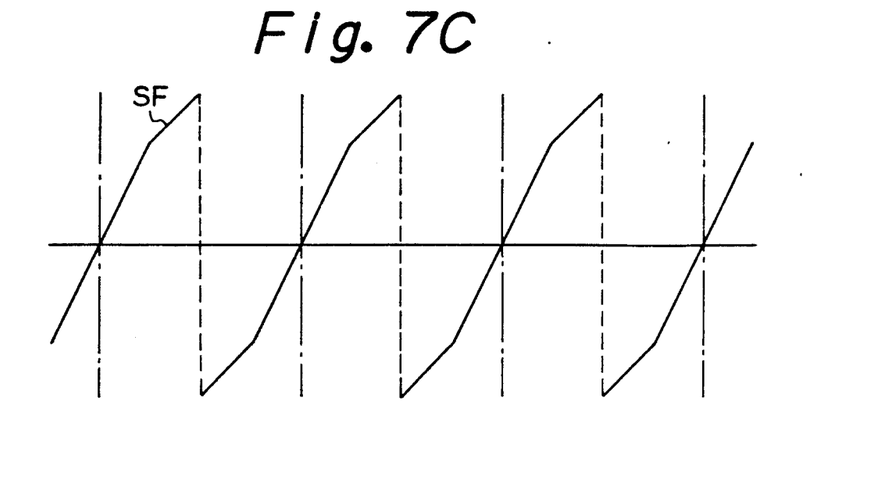

The level of the reproduction output of the first position detection signal 35A is set to SA, the level of the reproduction output of the second position detection signal 35B is set to SB, and the level of the reproduction output of the third position detection signal 35C is set to SC. In the example in which the track pitch Tp is equal to 4/3 of the track width Tw of the magnetic head 3, the levels SA and SB which change as shown in FIG. 7A are obtained. Therefore, the difference (SA−SB) between them shown by a broken line in FIG. 7A is equal to 0 in a state in which the track center coincides with the center of the magnetic head 3 and is set to a triangular wave whose value changes in accordance with the deviation between them. The polarity of the differential component is inverted by a polarity discrimination signal SW shown in FIG. 7B. The fine servo information SF like a sawtooth wave as shown in FIG. 7C is formed. That is, the differential component is inverted when the polarity discrimination signal SW is at the high level. The differential component is not inverted when the SW is at the low level. The fine servo information SF shown in FIG. 7C is formed by the polarity inverting process and the normalizing process. The polarity discrimination signal SW is produced on the basis of the clock synchronized with the reproduction signal. However, as will be explained hereinlater, it is preferable to switch the polarity on the basis of the reproduction outputs of the level detection signals 32X and 32Y.

A level SC of the reproduction output of the third position detection signal 35C is used to normalize the differential component. That is, the normalization is executed by the division of [(SA−SB)/SC] and the fine servo information SF of the position information is obtained. The level SC is constant irrespective of the positional deviation amount. The problems such that the linearity deteriorates due to the normalization and the sensitivity of the fine servo information SF is set to zero at a position near $\pm\frac{1}{4}$ Tp as in the conventional apparatus do not occur.

The reproduction output of the third position detection signal 35C can be expanded to other applications without limiting to the normalization. As one of the applications, the reproduction signal of the third position detection signal 35C can be used to detect the end of the servo zone. In this case, the signal which is recorded into the third position detection signal 35C is modulated by the same modulating method as that in the case of the addresses which are recorded into the address regions 33 and 34. For instance, when the addresses indicative of the track numbers are frequency modulated at the rates of 2 MBPS and 4 MBPS and the address in which all of the bits are set to "1" is not defined, the signal in which all of the bits are set to "1", that is, the pulse signal of 2 MBPS is recorded as the third position detection signal 35C. It is detected that the third position detection signal 35C was reproduced from the decoded output of the address. The end of the servo zone can be detected by such a detection.

On the other hand, the detection regarding the start point of the servo zone can be performed by the reproduction signal of the servo header 31. Therefore, for instance, a window pulse to predict the end point of the servo zone is generated on the basis of the clock synchronized with the reproduction signal and the detection signal of the servo header 31. The reproduction signal of the third position detection signal 35C obtained in the width of the window pulse can be obtained as an end signal of the servo zone. Since the detection signals of the start and end points are respectively obtained, the servo zone can be confirmed.

Further, the reproduction signal of the third position detection signal 35C can be used to control of the AGC provided for the reproduction signal. In the data region in which the digital data is reproduced, the AGC operation can be executed on the basis of the reproduction signal. In the servo zone, the AGC operation is performed by the AGC signal obtained by detecting the reproduction output of the third position detection signal 35C. By switching the AGC control signal on the basis of the detection of the servo zone, it is also possible to make the AGC operative even in the servo zone. The AGC in the servo zone is effective for the reproduction of the address signal.

d. Formation of address information

Figure 8A:
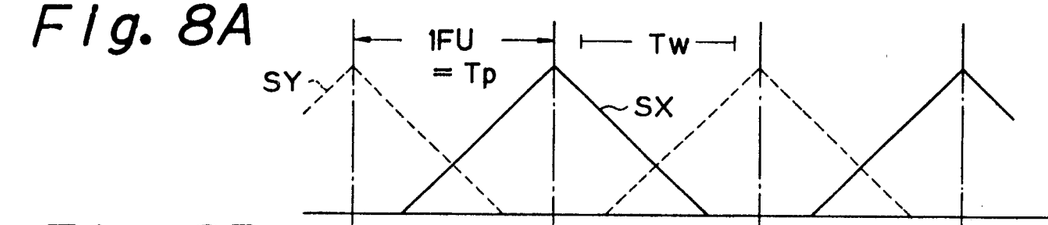
FIGS. 8A-8C are schematic diagrams which is used to explain the formation of address information.

Explanation will now be made with respect to the formation of the address information which is executed by using the reproduction outputs of the level detection signals 32X and 32Y and the address regions 33 and 34. The level of the reproduction output of the level detection signal 32X is set to SX and the level of the reproduction output of the level detection signal 32Y is set to SY. In the example in which the track pitch Tp is 4/3 times as large as the track width Tw of the magnetic head 3, as shown in FIG. 8A, the levels SX and SY like triangular waves are obtained for a change in position.

Figure 8B:
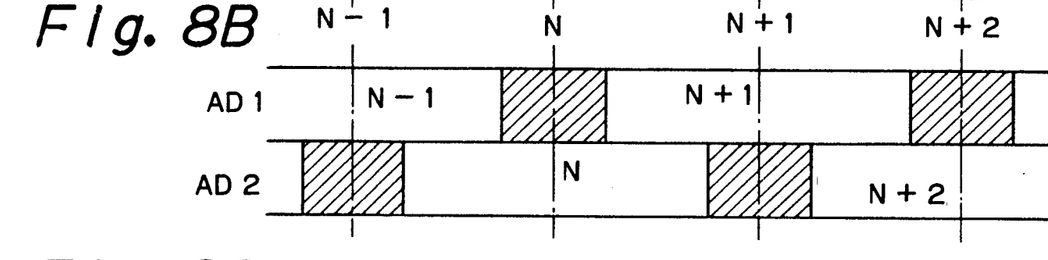

Assuming that the range which the fine servo information SF has is set to FU (in the example, 1 FU=Tp), the values of the addresses AD1 and AD2 which were respectively recorded in the address regions 33 and 34 change by "2" every 2 FU as shown in FIG. 8B. On the other hand, there is a phase difference of 1 Fu between them. In FIG. 8B, the hatched regions show ranges in which the addresses AD1 and AD2 are unspecified. When adjacent two addresses AD1 are simultaneously reproduced, for example, when the magnetic head 3 scans the position shown by H2 in FIG. 6, the address AD1 becomes unspecified. Similarly, there occurs a case where the address AD2 becomes unspecified. However, between the addresses AD1 and AD2, a phase difference of 1 FU exists in the range where the addresses become unspecified, so that the addresses AD1 and AD2 do not become simultaneously unspecified. In other words, the address of either AD1 or AD2 can be read at all of the positions. A condition in which such a process can be accomplished is (1 FU−WE>0) assuming that the width of the hatched region is set to WE.

In the holding circuits 13 and 14 in FIG. 4, the addresses held are updated every 2 FU and the addresses AD1 and AD2 shown in FIG. 8B are obtained. The addresses AD1 and AD2 and the SX and SY from the A/D converter 8 are supplied to the position calculation block 21 of the drive controller 9. In the position calculation block 21, by comparing the magnitudes of the levels SX and SY, one of the AD1 and AD2 is selected and the selected address is used as address information.

As shown in FIG. 6, the center of the address AD1 and the center of the level detection signal 32Y are made coincide. The center of the address AD2 and the center of the level detection signal 32X are made coincide. As will be understood from FIGS. 6, 8A and 8B, when there is a relation of (SX<SY), the address AD1 is selected. When there is a relation of (SX>SY), the address AD2 is selected. When (SX=SY), either one of the AD1 and AD2 is selected. The address information N−1, N, N+1, . . . which continuously change are decoded from the selected address. Therefore, the address information can be obtained at all of the positions on the magnetic disc. The linear and accurate position information is obtained by adding the address information and the fine servo information SF.

Figure 8C:
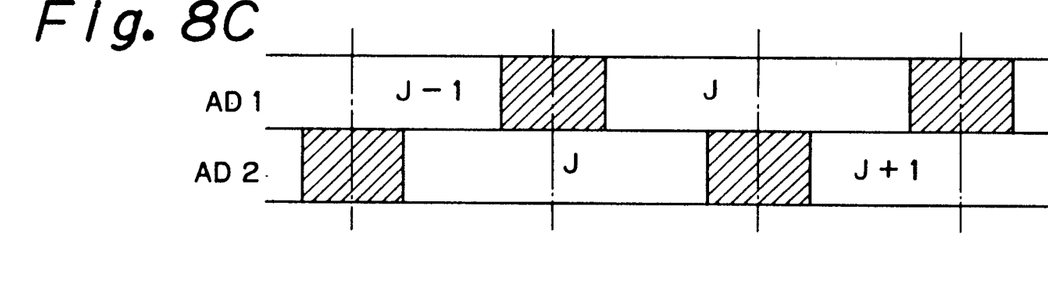

As shown in FIG. 8B, in the case of using the addresses which change every 2 FU, for instance, to express an address information of 256 tracks, each of the AD1 and AD2 needs eight bits. However, the necessary number of bits can be reduced by one bit by using the fact that the value of AD1 is an odd number and the value of AD2 is an even number. Namely, as shown in FIG. 8C, the addresses AD1 and AD2 which change by "1" every 2 FU are recorded into the address regions 33 and 34. N in FIG. 8B and J in FIG. 8C are set such that (J=½ N).

In a manner similar to the above, one of the addresses is selected on the basis of the magnitude relation between SX and SY. When the address AD2 is selected, (2×AD2) is used as address information. When the address AD1 is selected, (2×AD1 1) is used as address information. For instance, when the selected AD2 is J, the address information is decoded at (2×J=2×½ N=N). When the selected AD1 is J−1, the address information is decoded at (2×(J−1)+1 =2×(½ N−1)+1=N−1). Therefore, the number of bits of the address data which is recorded into the address regions 33 and 34 can be reduced by one bit as compared with the method shown in FIG. 8B. When the numbers of bits are equal, a double address space can be expressed.

The address information can be also provided for all of the tracks formed on the disc in a one-to-one correspondence relation. The address information which is repeated every tracks of a predetermined number, for instance, 512 tracks can be also added.

In the case of producing the fine servo information, the polarity of the differential component (SA−SB) is controlled by the polarity discrimination signal SW. When the position accuracy of the switching point of the polarity is low, there occurs a problem such that the linearity of the fine servo information SF deteriorates. From the above point, it is effective to execute the polarity switching control by the respective reproduction signals of the level detection signals 32X and 32Y.

As shown in FIG. 6, since the positional deviation between the first level detection signal 32X and the first position detection signal 35A and the positional deviation between the second level detection signal 32Y and the second position detection signal 35B are respectively accurately set to ½ Tp, the point of (SX=SY) coincides with the vertex of the level changes in $A and SB. Therefore, the polarity can be switched at the point of (SX=SY). On the other hand, as mentioned above, since the point at which the address information is updated is also located at (SX=SY), the updating of the address information and the switching of the polarity are executed at the same position. Thus, the position information which is obtained by adding the address information as the coarse servo information and the fine servo information continuously changes.

e. Modification

Figure 9:
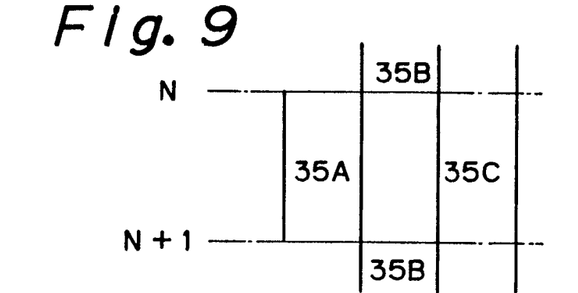
FIGS. 9 and 10A-10B are schematic diagrams respectively showing other examples of the servo zone.

When the position detection signals 35A and 35B are previously recorded, as shown in FIG. 9, the width can be also set to a value which is equal to the track pitch Tp. However, since (Tp>Tw), the substantial widths of the position detection signals 35A and 35B are equal to the track width Tw.

Figure 10A:
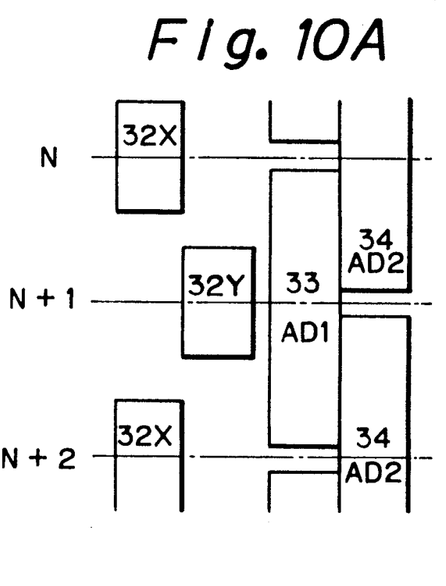
Figure 10B:
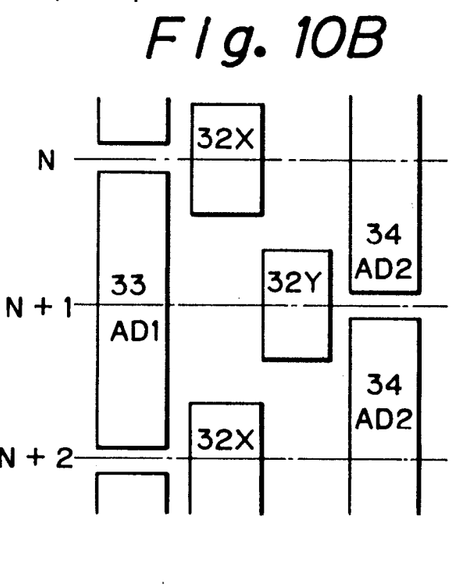

The orders of the address regions 33 and 34 and the level detection signals 32X and 32Y are not limited to the above embodiment. As shown in FIG. 10A, the level detection signals 32X and 32Y can be also recorded before the address regions 33 and 34. As shown in FIG. 10B, the level detection signals 32X and 32Y can be also recorded between the address regions 33 and 34.

The invention is not limited to the example in which the patterns in which signals of a predetermined frequency were recorded are arranged like a zigzag pattern and the fine servo information is obtained. The invention can be also applied to other patterns of a dibit type, tribit type and the like.

What is claimed is:

1. A disc memory apparatus comprising:
   transducer means for reading and writing information on a disc;
   at least one disc medium having a plurality of concentric tracks each of which is divided into plural data sectors and plural servo sectors therebetween,
   said data signal being recorded and read by said transducer means on and from said data sectors,
   said servo sectors having first address region for odd one of said concentric tracks and second address region for even one of said concentric tracks, wherein first and second address signals are prerecorded in said first and second address regions respectively,
   the width of said address regions in a radial direction of said disc medium being substantially larger than track pitch of said concentric tracks,
   said first and second address regions being located at different positions in a direction perpendicular to said radial direction, and
   said servo sectors further having first and second marker regions the centers of which are corresponding to the centers of said odd and even one of said concentric tracks respectively, wherein first and second marker signals are prerecorded in said first and second marker regions respectively;
   positioning means for positioning said transducer means on a selected one of said concentric tracks;
   servo signal processing means for receiving said address signals and marker signals and for outputting servo control signal; and
   positioning control means for receiving said servo control signal and for controlling said positioning means so that said transducer means seeks said selected one of said concentric tracks.

2. A disc memory apparatus according to claim 1, wherein said servo signal processing means comprises,
   comparator means for comparing levels of said first and second marker signal and for outputting a comparison signal,
   selector means for selecting one of said first and second address signals according to said comparison signal in such a manner that said first address signal is selected when the level of said first marker signal is larger than that of said second marker signal and that said second address signal is selected when the level of said second marker signal is larger than that of said first marker signal.

3. A disc memory apparatus according to claim 1, wherein said first and second marker regions being located at different positions in a direction perpendicular to said radial direction.

4. A disc memory apparatus according to claim 1, wherein the width of said address regions in a radial direction of said disc medium being approximately twice as large as a track pitch of said concentric tracks.

5. A disc memory apparatus according to claim 1, wherein said servo sectors have first and second fine servo regions, said first fine servo regions being located in outer side of each of said odd one of said concentric tracks and in inner side of each of said even one of said concentric tracks and said second fine servo region being located in inner side of each of said odd one of said concentric tracks and in outer side of each of said even one of said concentric tracks.

6. A disc memory apparatus comprising:
   transducer means for reading and writing information on a disc;
   at least one disc medium having a plurality of concentric tracks each of which is divided into plural data sectors and plural servo sectors therebetween,
   said data signal being recorded and read by said transducer means on and from said data sectors,
   said servo sectors having first and second fine servo region, said first fine servo region being located in outer side of each of said odd one of said concentric tracks and in inner side of each of said even one of said concentric tracks, and said second fine servo region being located in inner side of each of said odd one of said concentric tracks and in outer side of each of said even ones of said concentric tracks, wherein first and second servo signals are prerecorded in said first and second fine servo regions,
   said servo sectors further having a third fine servo region which is continuously provided in a radial direction of said disc medium, and
   said servo sectors further having an address region in which address signal is prerecorded for each of said concentric tracks,
   positioning means for positioning said transducer means on a selected one of said concentric tracks;
   servo signal processing means for receiving said first, second and third fine servo signals and said address signal and for outputting servo control signal; and
   positioning control means for receiving said servo control signal and for controlling said positioning means so that said transducer means is positioned precisely on said selected one of said concentric tracks.

7. A disc memory apparatus according to claim 6, wherein said servo signal processing means comprises:
   subtracter means for receiving said first and second fine servo signals and for providing an output signal corresponding to the difference between levels of said first and second fine servo signals; and
   normalizing means for normalizing said output signal of said subtracter means by the level of said third fine servo signal.

* * * * *